(12) United States Patent
Nakayama et al.

(10) Patent No.: US 9,036,575 B2
(45) Date of Patent: May 19, 2015

(54) RADIO COMMUNICATION SYSTEM, HIGH-POWER BASE STATION, LOW-POWER BASE STATION, AND COMMUNICATION CONTROL METHOD

(75) Inventors: Taku Nakayama, Kanagawa (JP); Kenta Okino, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 224 days.

(21) Appl. No.: 13/641,401

(22) PCT Filed: Apr. 15, 2011

(86) PCT No.: PCT/JP2011/059433
§ 371 (c)(1),
(2), (4) Date: Oct. 15, 2012

(87) PCT Pub. No.: WO2011/129447
PCT Pub. Date: Oct. 20, 2011

(65) Prior Publication Data
US 2013/0028228 A1    Jan. 31, 2013

(30) Foreign Application Priority Data

Apr. 16, 2010   (JP) .................................. 2010-095548
Nov. 11, 2010   (JP) .................................. 2010-253279

(51) Int. Cl.
*H04W 16/04*    (2009.01)
*H04L 5/00*      (2006.01)
(Continued)

(52) U.S. Cl.
CPC .............. *H04W 16/04* (2013.01); *H04L 5/0096* (2013.01); *H04W 72/0486* (2013.01); *H04W 16/32* (2013.01)

(58) Field of Classification Search
CPC ..... H04W 16/10; H04W 16/14; H04W 16/32; H04W 72/0486; H04L 5/0073; H04L 5/0092; H04L 5/0096
USPC ................ 370/329, 336, 431; 455/452.2, 453
See application file for complete search history.

(56) References Cited

U.S. PATENT DOCUMENTS

2010/0048221 A1 *   2/2010   Yavuz et al. ................ 455/452.2
2010/0113060 A1 *   5/2010   Bai et al. ........................ 455/453
2010/0124930 A1 *   5/2010   Andrews et al. .............. 455/436
(Continued)

OTHER PUBLICATIONS

Kyocera; "Range Expansion Performance and Interference Management for Control Channels in Outdoor Hotzone Scenario"; 3GPP TSG WG1 Meeting #60bis r1-102363; Beijing, China; Apr. 12-16, 2010.
(Continued)

*Primary Examiner* — Xavier Szewai Wong
(74) *Attorney, Agent, or Firm* — Studebaker & Brackett PC

(57) ABSTRACT

A radio communication system (1) includes a pico-cell base station (PeNB) which is located in the communication area of a macro-cell base station (MeNB) and the transmission power of which is lower than that of the macro-cell base station (MeNB). For radio resources that can be used as PDSCH, a resource division ratio that is a ratio between unusable PDSCH resources, which cannot be used by the macro-cell base station (MeNB), and usable PDSCH resources, which can be used by the macro-cell base station (MeNB), is decided, and a radio resource is allocated, out of the usable PDSCH resources defined in accordance with the decided resource division ratio, to a radio terminal that is to connect to the macro-cell base station (MeNB). The resource division ratio is decided based on the traffic load of each base station.

17 Claims, 13 Drawing Sheets

(51) Int. Cl.
*H04W 72/04* (2009.01)
*H04W 16/32* (2009.01)

(56) References Cited

U.S. PATENT DOCUMENTS

2010/0202377 A1* 8/2010 Nishio et al. .................. 370/329
2011/0188481 A1* 8/2011 Damnjanovic et al. ....... 370/336

OTHER PUBLICATIONS

Qualcomm Incorporated; "Importance of Serving Cell Selection in Heterogeneous Networks"; 3GPP TSG-RAN WG1 #60 R1-101506; San Francisco, CA; Feb. 22-26, 2010.

NTT Docomo; Performance Evaluations of Heterogeneous Networks; 3GPP TSG RAN WG1 Meeting #60 R1-101226; San Francisco, CA; Feb. 22-26, 2010.

International Search Report; PCT/JP2011/059433; Jun. 21, 2011.

Japanese Office Action "Notification of Reason(s) for Refusal" dated Mar. 12, 2013, which corresponds to Japanese Patent Application No. 2012-510721 and is related to U.S. Appl. No. 13/641,401 with translation.

An Office Action issued by the Korean Patent Office on Feb. 17, 2014, which corresponds to Korean Patent Application No. 10-2012-7028239 and is related to U.S. Appl. No. 13/641,401; with English language statement of relevance.

The evidential screenshot for R1-102363's disclosed dated Apr. 6, 2010.

* cited by examiner (a)

(b)

(c)

$m : n = N_{PUE} : N_{MUE}$  : AdaptiveICIC, (a) LOW TRAFFIC (b) HIGH TRAFFIC (a) COMPARISON OF TOTAL NORMALIZED TP GAINS USING RE-BIAS/ICIC DIVISION RATIOS (LOW TRAFFIC)

(b) COMPARISON OF RECEIVED SINRs USING RE-BIAS/ICIC DIVISION RATIOS (LOW TRAFFIC)

(a) COMPARISON OF TOTAL NORMALIZED TP GAINS USING RE-BIAS/ICIC DIVISION RATIOS (HIGH TRAFFIC)

(b) COMPARISON OF RECEIVED SINRs USING RE-BIAS/ICIC DIVISION RATIOS (HIGH TRAFFIC)

RADIO COMMUNICATION SYSTEM, HIGH-POWER BASE STATION, LOW-POWER BASE STATION, AND COMMUNICATION CONTROL METHOD

TECHNICAL FIELD

The present invention relates to a radio communication system, a high-power base station, a low-power base station, and a communication control method, to which a heterogeneous network is applied.

BACKGROUND ART

LTE (Long Term Evolution) and LTE Advanced which is an advance type of LTE are next-generation systems providing communication which is faster and supports a larger capacity than the third-generation and the third-and-a-half generation cellular wireless communication systems currently in operation. LTE and LTE Advanced are standardized by a standardization organization called 3GPP (3rd Generation Partnership Project).

In a downlink in the LTE systems (including LTE Advanced), a radio base station sends user data to a radio terminal by using a data transmission channel called PDSCH (Physical Downlink Shared Channel). Note that the downlink refers to communication in a direction from the radio base station to the radio terminal, whereas an uplink refers to communication from the radio terminal to the radio base station.

In LTE Advanced, provision of a heterogeneous network is under consideration. In a heterogeneous network, low-power base stations (so-called pico-cell base stations, femto-cell base stations, or relay nodes) are installed in a communication area of a high-power base station (a so-called macro-cell base station). A heterogeneous network is capable of distributing the load of the high-power base station to the low-power base stations.

However, since a radio terminal is generally connected to a radio base station which sends radio signals with the highest power among multiple radio base stations, in the heterogeneous network the radio terminal has a low chance of being connected to the low-power base stations with low transmission power.

In consideration of such a circumstance, there is proposed a method for expanding the coverage (communication area) of the low-power base station by performing control such that the radio terminal is connected to the low-power base station even when the received power from the low-power base station is not the highest (see, for example, Non-patent Document 1).

PRIOR ART DOCUMENT

Non-Patent Document

NON-PATENT DOCUMENT 1: 3GPP R1-101506 "Importance of Serving Cell Selection in Heterogeneous Networks" February, 2010.

SUMMARY OF THE INVENTION

When radio resources used as data transmission channels by neighboring radio base stations overlap each other, the data transmission channel of one of the radio base stations receives interference from the data transmission channel of the other base station, and therefore user data cannot be received normally from the one radio base station via its data transmission channel.

This problem is even more severe in the method of expanding the coverage of the low-power base station in the heterogeneous network since the data transmission channel of the low-power base station is highly likely to receive strong interference from the data transmission channel of the high-power base station.

Accordingly, the present invention has an objective of providing a radio communication system, a high-power base station, a low-power base station, and a communication control method capable of improving throughput of the overall system by reducing interference between the base stations in a heterogeneous network.

The present invention has the following features in order to solve the aforementioned problem. First of all, a feature of the radio communication system is summarized as follows. A radio communication system (radio communication system 1) comprises: a high-power base station (macro-cell base station MeNB); and a low-power base station (e.g. pico-cell base station PeNB) installed in a communication area of the high-power base station and having lower transmission power than the high-power base station, wherein the radio communication system further comprising a division ratio determination unit (division ratio determination unit 123 or division ratio determination unit 225) configured to determine a resource division ratio of radio resources to be used as a particular downlink channel by the high-power base station, the resource division ratio being a ratio between first radio resources (e.g. usable PDSCH resources or ordinary-power PDSCH resources) and second radio resources (e.g. unusable PDSCH resources or low-power PDSCH resources) for which transmission power is limited to lower than that of the first radio resources, wherein the division radio determination unit determines the resource division ratio based on a traffic load of the low-power base station. Here, the particular downlink channel is a downlink data transmission channel (PDSCH in LTE) for example. However, the particular downlink channel may be a downlink control information transmission channel (PDCCH in LTE) and so on, not apply only to downlink data transmission channel. The low-power base station is a pico-cell base station or a femto-cell base station for example. However, the low-power base station may be a relay node and so on, not apply only to the pico-cell base station or the femto-cell base station.

With the radio communication system according to the aforementioned feature, first radio resources and second radio resources for which transmission power is limited to lower than that of the first radio resources are provided with radio resources to be used as a particular downlink channel by the high-power base station. It is possible to improve the throughput of the low-power base station since the radio resources of the low-power base station corresponding to the second radio resources of the high-power base station can avoid interference from the high-power base station. Moreover, since the resource division ratio is determined based on the traffic load of each of the low-power base station, the ratio between the second radio resources and the first radio resources of the high-power base station can be appropriately set, preventing the second radio resources from being overmuch. Thereby, not only is the throughput of the low-power base station improved, but also decrease in the throughput of the high-power base station can be prevented, allowing an improvement in the throughput of the overall system.

Another feature of the radio communication system is summarized as follows. The radio communication system according to the aforementioned feature further comprises a resource allocator (resource allocator 124) configured to allocate radio resources to a radio terminal connected to the high-power base station, wherein the first radio resources are radio resources (e.g. usable PDSCH radio resources) usable by the high-power base station, the second radio resources are radio resources (e.g. unusable PDSCH radio resources) unusable by the high-power base station, and the resource allocator allocates radio resources to the radio terminal connected to the high-power base station from the first radio resources defined according to the resource division ratio determined by the division ratio determination unit.

Another feature of the radio communication system is summarized as follows. The radio communication system according to the aforementioned feature further comprises a resource allocator (resource allocator 124) configured to allocate radio resources to a radio terminal connected to the high-power base station, wherein the first radio resources are radio resources (e.g. ordinary-power PDSCH resources) for which transmission power of the high-power base station is not limited, the second radio resources are radio resources (e.g. low-power PDSCH resources) for which transmission power of the high-power base station is limited, and the resource allocator allocates radio resources to the radio terminal connected to the high-power base station from the first radio resources and the second radio resources defined according to the resource division ratio determined by the division ratio determination unit.

Another feature of the radio communication system is summarized as follows. In the radio communication system according to the aforementioned feature, when a plurality of the low-power base stations are installed in the communication area of the high-power base station, the division ratio determination unit determines the resource division ratio based on a mean of traffic loads of the respective low-power base stations.

Another feature of the radio communication system is summarized as follows. In the radio communication system according to the aforementioned feature, the division ratio determination unit determines the resource division ratio based on the traffic load of the low-power base station and a traffic load of the high-power base station.

Another feature of the radio communication system is summarized as follows. In the radio communication system according to the aforementioned feature, the division ratio determination unit determines the resource division ratio such that the ratio between the second radio resources and the first radio resources is equal to a ratio between the traffic load of the low-power base station and the traffic load of the high-power base station.

Another feature of the radio communication system is summarized as follows. In the radio communication system according to the aforementioned feature, the division ratio determination unit determines the resource division ratio such that, with the traffic load of the high-power base station being constant, the higher the traffic load of the low-power base station, the more the second radio resources and the less the first radio resources.

Another feature of the radio communication system is summarized as follows. In the radio communication system according to the aforementioned feature, the division ratio determination unit determines the resource division ratio such that, with the traffic load of the low-power base station being constant, the higher the traffic load of the high-power base station, the less the second resources and the more the first resources.

Another feature of the radio communication system is summarized as follows. In the radio communication system according to the aforementioned feature, the particular downlink channel is a data transmission channel for transmitting user data to a radio terminal.

Another feature of the radio communication system is summarized as follows. In the radio communication system according to the aforementioned feature, the second radio resources are at least part of a total downlink frequency band, and the first radio resources are the rest of the total downlink frequency band, excluding the part of the frequency band.

Another feature of the radio communication system is summarized as follows. In the radio communication system according to the aforementioned feature, the part and the rest of the frequency band are each an integral multiple of a frequency unit (e.g. sub-band) by which a radio terminal measures reception quality.

Another feature of the radio communication system is summarized as follows. In the radio communication system according to the aforementioned feature, the second radio resources are at least part of a time range of a data region for transmitting user data to a radio terminal in a downlink communication time frame (e.g. subframe), and the first radio resources are the rest of the time range of the data region, excluding the part of the time range.

Another feature of the radio communication system is summarized as follows. In the radio communication system according to the aforementioned feature, the traffic load is the number of radio terminals in communication (e.g. active state).

A feature of a high-power base station is summarized as follows. A high-power base station comprises: a receiver (X2 interface communication unit 140) configured to receive information indicating a traffic load of a low-power base station installed in a communication area of the high-power base station and having lower transmission power than the high-power base station; and a division ratio determination unit (division ratio determination unit 123) configured to use the information indicating the traffic load received by the receiver to determine a resource division ratio of radio resources to be used as a particular downlink channel by the high-power base station, the resource division ratio being a ratio between first radio resources and second radio resources for which transmission power is limited to lower than that of the first radio resources.

A feature of a low-power base station is summarized as follows. A low-power base station installed in a communication area of a high-power base station and having lower transmission power than the high-power base station, comprises: a division ratio determination unit (division ratio determination unit 225) configured to use a traffic load of the low-power base station to determine a resource division ratio of radio resources to be used as a particular downlink channel by the high-power base station, the resource division ratio being a ratio between first radio resources and second radio resources for which transmission power is limited to lower than the first radio resources; and a transmitter (X2 interface communication unit 240) configured to transmit, to the high-power base station, information indicating the resource division ratio determined by the division ratio determination unit.

Another feature of the low-power base station is summarized as follows. The low-power base station according to the aforementioned feature further comprises a receiver configured to receive information indicating a traffic load of the high-power base station, wherein the division ratio determination unit determines the resource division ratio based on the traffic load of the low-power base station and the traffic load of the high-power base station received by the receiver.

A feature of a communication control method is summarized as follows. A communication control method comprises: using a traffic load of a low-power base station installed in a communication area of a high-power base station to determine a resource division ratio of radio resources to be used as a particular downlink channel by the high-power base station, the resource division ratio being a ratio between first radio resources and second radio resources for which transmission power is limited to lower than the first radio resources.

The present invention can provide a radio communication system, a high-power base station, a low-power base station, and a communication control method capable of improving throughput of the overall system by reducing interference between the base stations in a heterogeneous network.

DESCRIPTION OF THE EMBODIMENTS

Figure 1:
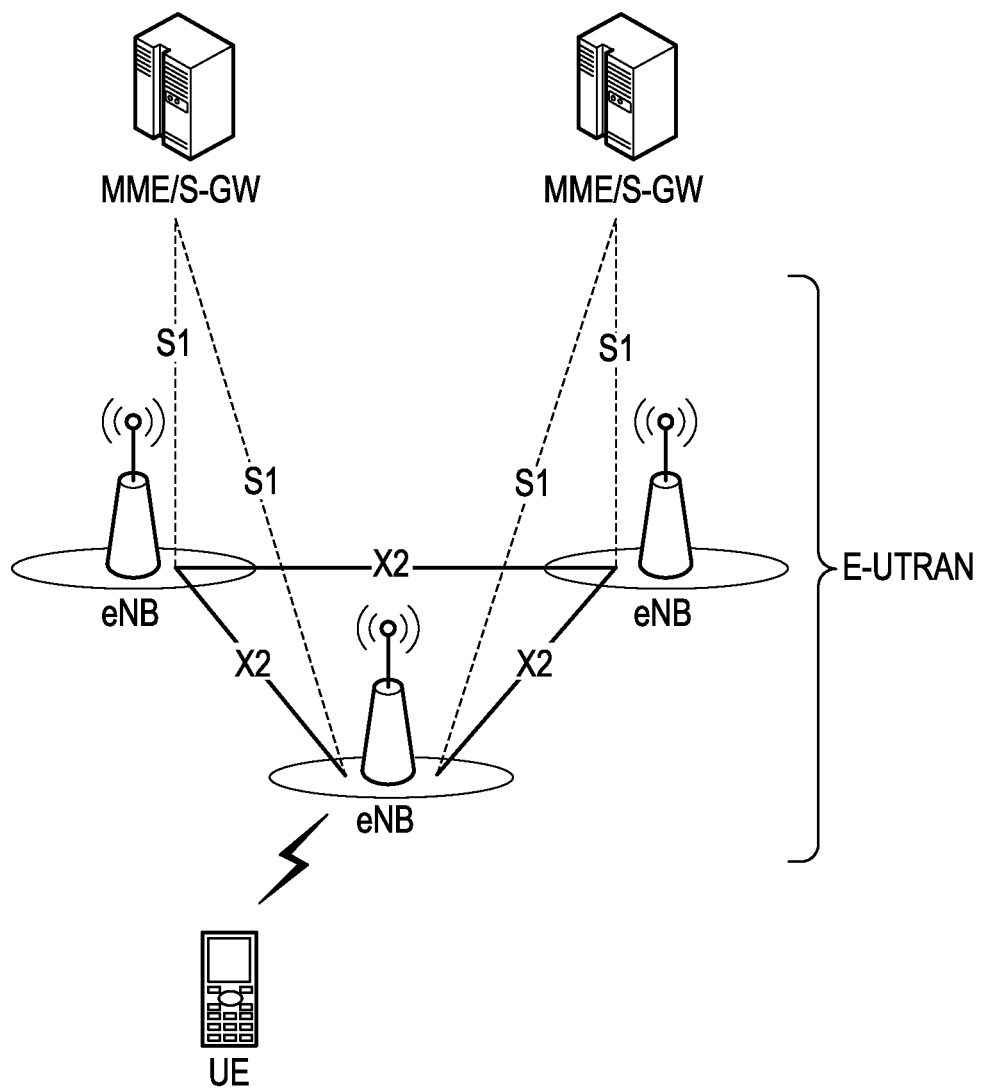
FIG. 1 is a diagram illustrating the overview of an LTE system according to a first embodiment and a second embodiment.

Descriptions are given of first to third embodiments and other embodiments of the present invention. In the drawings referred to by the following embodiments, the same or similar parts are given the same or similar reference numerals.

[Overview of the LTE System]

Before describing the first to third embodiments, an overview of an LTE system is described, on points related to the present invention.

FIG. 1 is a diagram illustrating the overview of the LTE system. As shown in FIG. 1, multiple radio base stations eNB configure E-UTRAN (Evolved-UMTS Terrestrial Radio Access Network). Each of the various radio base stations eNB forms a cell which consists of a communication area where a radio terminal UE is to be provided with services.

The radio terminal UE is a radio communication device that is owned by the user, and is also called a user device. The radio terminal UE is configured to connect to a radio base station eNB from which the radio terminal UE measures the highest reference signal received power (RSRP) among the multiple radio base stations eNB. Note that it is not limited to RSRP, and other reception quality indices, such as SNR (Signal to Noise ratio), may be used instead.

The radio base stations eNB are capable of communicating with each other via X2 interfaces which are logical communication paths providing communications between the base stations. Each of the multiple radio base stations eNB can communicate with EPC (Evolved Packet Core), or more specifically, MME (Mobility Management Entity)/S-GW (Serving Gateway), via an S1 interface.

In radio communication between each radio base station eNB and the radio terminal UE, an OFDMA (Orthogonal Frequency Division Multiple Access) scheme is employed as the multiplexing scheme for the downlink, and an SC-FDMA (Single-Carrier Frequency Division Multiple Access) scheme is employed as the multiplexing scheme for the uplink. Further, an FDD (Frequency Division Duplex) scheme or a TDD (Time Division Duplex) scheme is employed as the duplexing scheme.

FIG. 2(a) is a frame configuration diagram showing the configuration of a downlink radio frame used when the FDD scheme is employed. FIG. 2(b) is a frame configuration diagram showing the configuration of a downlink subframe.

As shown in FIG. 2(a), the downlink radio frame is configured with ten downlink subframes, and each downlink subframe is configured with two downlink slots. Each downlink subframe is 1 ms long, and each downlink slot is 0.5 ms long. Each downlink slot contains seven OFDM symbols in the time-axis direction (time domain), and contains multiple resource blocks (RB) in the frequency-axis direction (frequency domain) as shown in FIG. 2(b). Each RB contains 12 sub-carriers.

As shown in FIG. 2(b), each downlink subframe contains two successive downlink slots. A maximum of three OFDM symbols from the top of the first downward slot of each downlink subframe is a control region configuring radio resources used as PDCCH (Physical Downlink Control Channel) for transmitting control information. The control information corresponds to information such as uplink and downlink scheduling information (i.e., information on allocated radio resources). The rest of the OFDM symbols composing the downlink subframe is a data region configuring radio resources used as PDSCH (Physical Downlink Shared Channel) for transmitting user data. The radio terminal UE can identify user data transmitted via PDSCH by decoding the control information transmitted via PDSCH.

First Embodiment

The first embodiment of the present invention is described next. The first embodiment is described using, as an example, a heterogeneous network arrangement in which pico-cell base stations PeNB which are low-power base stations are installed inside a communication area (a macro cell) of a macro-cell base station MeNB which is a high-power base station.

In the following first embodiment, descriptions are given of (1) the configuration of a radio communication system, (2) interference control by resource division, (3) the configuration of a macro-cell base station, (4) the configuration of a pico-cell base station, (5) operations of the radio communication system, and (6) advantageous effects of the first embodiment.

(1) Configuration of the Radio Communication System

Figure 3:
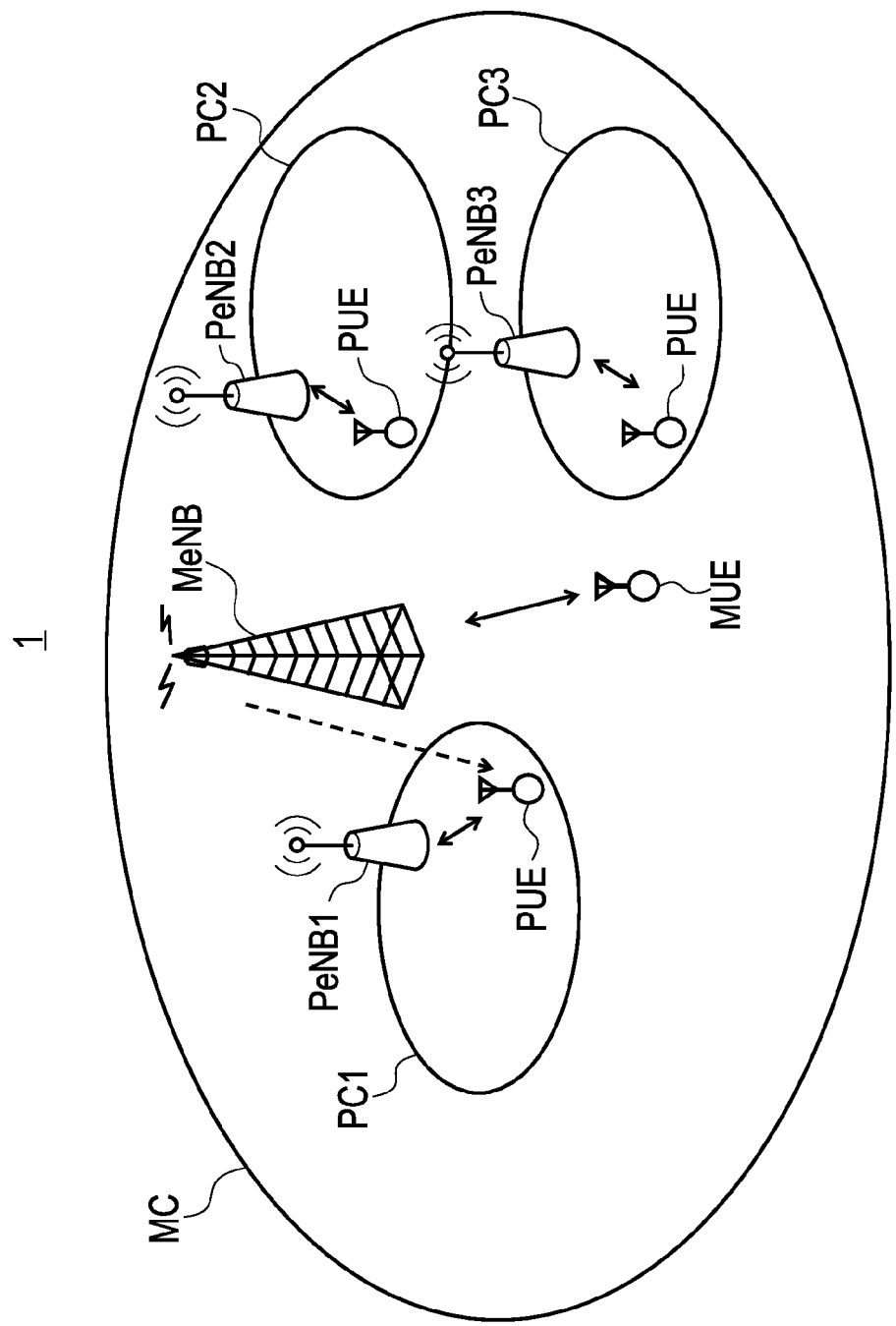
FIG. 3 is a schematic configuration diagram of a radio communication system according to the first embodiment.

FIG. 3 is a diagram of the schematic configuration of a radio communication system 1 according to the first embodiment.

As shown in FIG. 3, the radio communication system 1 includes a macro-cell base station MeNB (a high-power base station or a large-output base station), a radio terminal MUE connected to the macro-cell base station MeNB, pico-cell base stations PeNB1 to PeNB3 (low-power base stations or small-output base stations) which are installed within a macro cell MC formed by the macro-cell base station MeNB and are adjacent to the macro-cell base station MeNB, and radio terminals PUE connected to the pico-cell base stations PeNB1 to PeNB3 in their respective pico cells PC. Below, the pico-cell base stations PeNB1 to PeNB3 are simply called pico-cell base stations PeNB when no particular differentiation is necessary among them. The macro-cell base station MeNB and the pico-cell base stations PeNB use a common frequency band. In addition, the pico cells PC formed by the pico-cell base stations PeNB are called "hot zones" below.

The pico-cell base stations PeNB (also called hot-zone nodes) are low-power base stations with smaller transmission power than the macro-cell base station MeNB. Accordingly, in the heterogeneous network, when a maximum received power standard (called an RP standard below), which is a connection target selection standard where the radio terminal UE selects and connects to the radio base station eNB having the highest RSRP, is employed, the coverage of the pico-cell base stations PeNB might decrease. Especially when the pico-cell base stations PeNB are located close to the macro-cell base station MeNB, the coverage of the pico-cell base stations PeNB is so decreased that the pico-cell base stations PeNB cannot be used effectively.

The following two methods can be mainly used to allow the coverage of each pico-cell base station PeNB to expand without increasing the transmission power of the pico-cell base station PeNB.

In the first method, instead of using the RP standard where the radio base station eNB transmitting radio signals of the highest RSRP is selected as a connection target of the radio terminal UE, the radio base station eNB having the smallest propagation loss (path loss) with the radio terminal UE is selected as a connection target of the radio terminal UE. In this way, the radio base station eNB closest to the radio terminal UE is for example selected as the connection target, allowing expansion of the coverage of the pico-cell base stations PeNB. Such a connection target selection standard is referred to as a minimum path-loss standard (called a PL standard below).

In the second method, when the radio terminal UE can receive radio signals from each of the macro-cell base station MeNB and the pico-cell base stations PeNB, before comparing the RSRP of the macro-cell base station MeNB and the RSRPs of the pico-cell base stations PeNB, a bias value is added to each of the RSRPs of the pico-cell base stations PeNB. By giving bias to the RSRPs of the pico-cell base stations PeNB, the offset RSRPs are more likely to exceed the RSRP of the macro-cell base station MeNB. Consequently, the pico-cell base stations PeNB are preferentially selected as the connection target, achieving expansion of the coverage of the pico-cell base stations PeNB. Such a connection target selection standard is referred to as a range expansion standard (called an RE standard below). By making the bias value equal to the difference in transmission power between the macro-cell base station MeNB and the pico-cell base station PeNB (e.g., 16 dB), the RE standard becomes a connection target selection standard equivalent to the PL standard.

In the first embodiment, the coverage of the pico-cell base station PeNB is expanded using the RE standard. For example, the connection target of the radio terminal UE is selected by the radio terminal UE when the radio terminal UE is in standby (an idle state), and selected by the radio base station eNB when the radio terminal UE is in communication (an active state). In the active state, the radio terminal UE periodically gives RSRP measurement values to the radio base station eNB to which the radio terminal UE is connected. Accordingly, the radio base station eNB to which the radio terminal UE is connected can select the next connection target of the radio terminal UE and hand-over the radio terminal UE to the next connection target.

The macro-cell base station MeNB uses a PDSCH to transmit user data to the radio terminal MUE. The pico-cell base station PeNB uses a PDSCH to transmit user data to the radio terminal PUE. When the frequency bands of these PDSCHs overlap each other, the PDSCHs of the macro-cell base station MeNB and the pico-cell base station PeNB interfere with each other.

When the coverage of the pico-cell base station PeNB is expanded, the radio terminal PUE connected to the pico-cell base station PeNB sometimes receives higher power from the macro-cell base station MeNB than from the pico-cell base station PeNB. In this case, the PDSCH of the pico-cell base station PeNB is strongly interfered with by the PDSCH of the macro-cell base station MeNB, making the radio terminal PUE unable to receive (decode) user data.

(2) Interference Control by Resource Division

In the downlink of the heterogeneous network, if the coverage is expanded by giving bias according to the RE standard so that the coverage may be larger than that of the hot zone formed by the RP standard, the difference in transmission power between the macro-cell base station MeNB and the pico-cell base station PeNB causes interference power to be larger than desired signal power. Then, the radio terminal UE not having an optimal SINR is consequently contained in the hot zone. Such radio terminal UE is basically interfered with strongly by the macro-cell base station MeNB having high transmission power, so that the SINR becomes very low. To avoid this, in the first embodiment, interference control is performed using ICIC (Inter-cell interference coordination) as follows.

Figure 4:
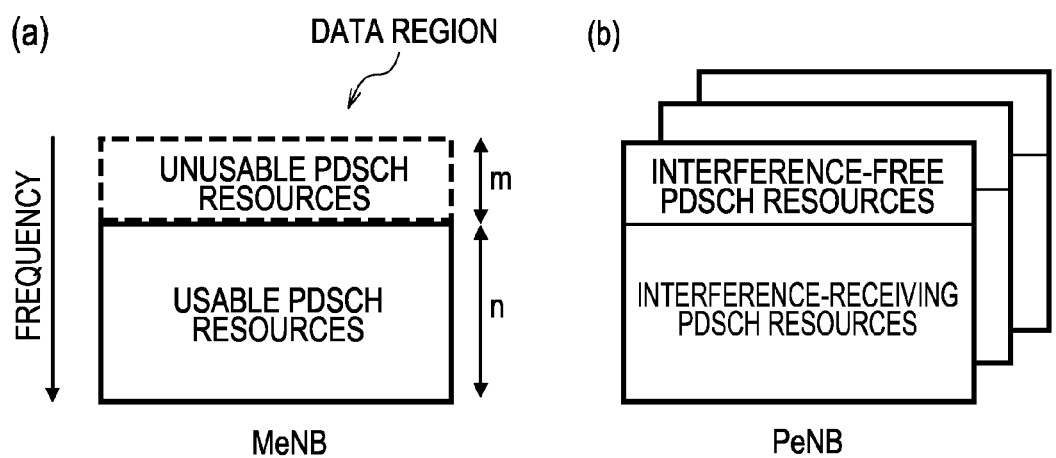
FIG. 4 is a diagram illustrating ICIC according to the first embodiment.

FIG. 4 is a diagram illustrating ICIC according to the first embodiment.

As shown in FIG. 4(a), the PDSCH resources (corresponding to the data region shown in FIG. 2(b)) of the macro-cell base station MeNB is divided by frequency, and part of the PDSCH resources is not used so that the unused part can be used by the radio terminal PUE having a low SINR in the hot zone. Herein, the PDSCH resources not usable by the macro-cell base station MeNB are also called "unusable PDSCH resources," and the PDSCH resources usable by the macro-cell base station MeNB are also called "usable PDSCH resources." In the first embodiment, the unusable PDSCH resources are at least part of the total downlink resource blocks, and the usable PDSCH resources are the rest of the total downlink resource blocks, i.e., resource blocks other than the part described above. In the first embodiment, the usable PDSCH resources correspond to the first radio resources, and the unusable PDSCH resources correspond to the second radio resources.

As shown in FIG. 4(b), the radio resources which correspond to the unusable PDSCH re sources are not interfered with by the macro-cell base station MeNB. Accordingly, the pico-cell base station PeNB allocates such non-interfered PDSCH resources to the radio terminal PUE of a low SINR. To be more specific, the radio terminal PUE periodically feeds back a measurement result of reception quality as a channel quality indicator (CQI) to the pico-cell base station PeNB, and the pico-cell base station PeNB can allocate the non-interfered PDSCH resources preferentially to the radio terminal PUE in response to a feedback of a favorable CQI for the non-interfered PDSCH resources.

Such ICIC by frequency division can avoid interference in the hot zone, but instead decreases the usable PDSCH resources that can be used by the radio terminal MUE connected to the macro-cell base station MeNB. For this reason, for performance improvement by coverage expansion of the hot zone, the effect of performance improvement by load distribution needs to exceed the loss due to a decrease in the usable resources by the frequency division. However, traffic conditions and situations of base station establishment vary in actual environments, and it is quite unlikely that a certain combination of a bias value of the RE standard and frequency division effective in one environment is also effective in another environment. Therefore, a method effective in a current environment needs to be found using a trial-and-error method, but it is unrealistic in actual operation.

Instead, the traffic load of the pico-cell base station PeNB and the traffic load of the macro-cell base station MeNB are used to determine a resource division ratio which is a ratio between the unusable PDSCH resources and the usable PDSCH resources. In the first embodiment, the traffic load means the number of active radio terminals. Thus, the traffic load of the pico-cell base station PeNB is the number of active radio terminals PUE, and the traffic load of the macro-cell base station MeNB is the number of active radio terminals MUE. When multiple pico-cell base stations PeNB are installed in the same macro cell as in the example of FIG. 1, the mean of the numbers of active radio terminals PUE of the respective pico-cell base stations PeNB is the traffic load of the pico-cell base station PeNB.

The resource division ratio can be set in any manner, but due to the LTE specifications, the resources are divided according to the resolution of a fed-back CQI. To be more specific, the frequency band of the usable PDSCH resources and the frequency band of the unusable PDSCH resources are each an integral multiple in a frequency unit by which the radio terminal UE measures reception quality (channel quality). This frequency unit is called a sub-band.

As shown in FIGS. 4(a) and 4(c), the ratio (m:n) between frequency band m of the unusable PDSCH resources and frequency band n of the usable PDSCH resources is equal to the ratio ($N_{PUE}$:$N_{MUE}$) between the number $N_{PUE}$ of radio terminals PUE and the number $N_{MUE}$ of radio terminals MUE. In the first embodiment, the number $N_{MUE}$ of radio terminals PUE is the mean of the numbers of radio terminals PUE of the respective pico-cell base stations PeNB1 to PeNB3. From the ratio between frequency band m of the unusable PDSCH resources and frequency band n of the usable PDSCH resources, the number of resource blocks RB of the unusable PDSCH resources is obtained as shown in Formula (1).

[Formula 1]

$$RB = SubbandSize \cdot \left[ N_{RB} \cdot \frac{m}{(m+n)} \cdot \frac{1}{SububandSize} \right] \quad (1)$$

In the formula, SubbandSize indicates the size of a fed-back CQI (resolution), and $N_{RB}$ indicates the total number of RBs in the downlink frequency band.

(3) Configuration of the Macro-Cell Base Station

Figure 5:
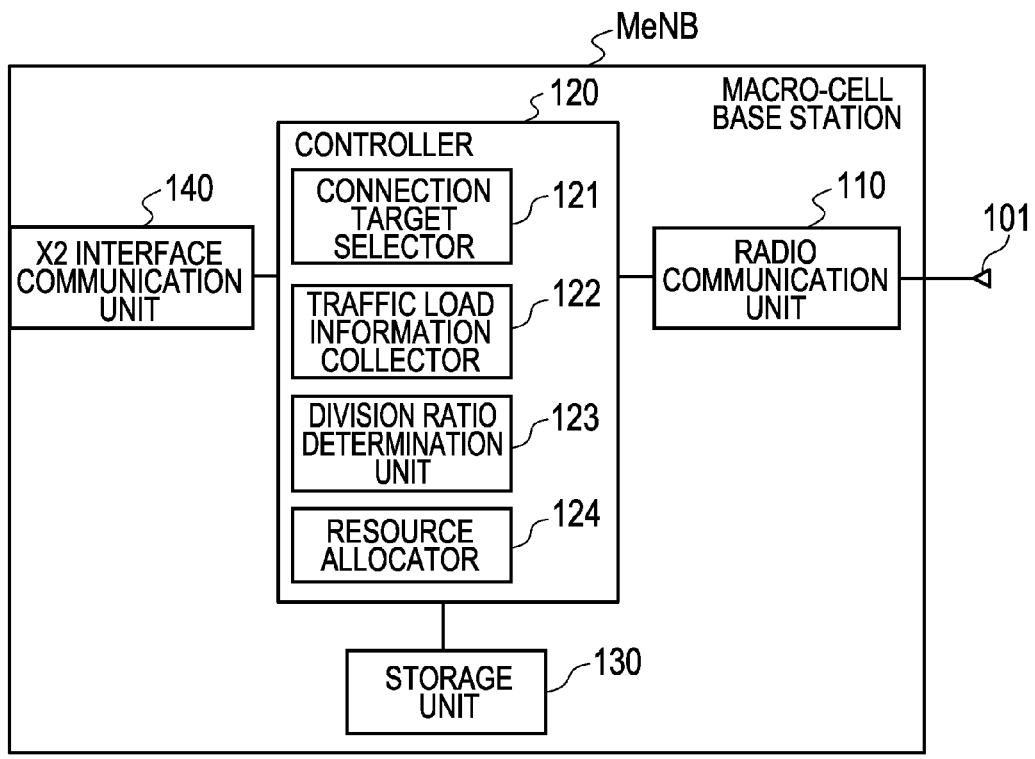
FIG. 5 is a block diagram showing the configuration of a macro-cell base station according to the first embodiment.

The configuration of the macro-cell base station MeNB is described next. FIG. 5 is a block diagram showing the configuration of the macro-cell base station MeNB according to the first embodiment.

As shown in FIG. 5, the macro-cell base station MeNB includes an antenna unit 101, a radio communication unit 110, a controller 120, a storage unit 130, and an X2 interface communication unit 140.

The radio communication unit 110 is configured with, for example, a radio frequency (RF) circuit, a base band (BB) circuit, or the like, and configured to exchange radio signals with the radio terminal MUE via the antenna unit 101. The radio communication unit 110 is also configured to modulate transmission signals and demodulate received signals.

The controller 120 is configured with, for example, a CPU, and is configured to control various functions of the macro-cell base station MeNB. The storage unit 130 is configured with a memory for example, and is configured to store various pieces of information used for the control of the macro-cell base station MeNB, or the like. The X2 interface communication unit 140 is configured to use an X2 interface to perform communications with other radio base stations.

The controller 120 includes a connection target selector 121, a traffic load information collector 122, a division ratio determination unit 123, and a resource allocator 124.

The connection target selector 121 is configured to select the radio base station to which the radio terminal MUE is to be connected next, based on RSRP information (i.e., a measurement report) informed of by the radio terminal MUE. When the radio terminal MUE receives reference signals from the macro-cell base station MeNB and the pico-cell base station PeNB, before comparing $RSRP_{MeNB}$ of the macro-cell base station MeNB and $RSRP_{PeNB}$ of the pico-cell base station PeNB, the connection target selector 121 gives bias to $RSRP_{PeNB}$. When $RSRP_{PeNB}$ thus given bias is higher than $RSRP_{MeNB}$, the connection target selector 121 performs hand-over control, switching the connection target of the radio terminal MUE to the pico-cell base station PeNB.

The traffic load information collector 122 is configured to periodically collect information on the traffic load of each of the macro-cell base station MeNB and the pico-cell base stations PeNB.

The division ratio determination unit 123 is configured to determine a resource division ratio based on the information on the traffic load of each of the macro-cell base station MeNB and the pico-cell base stations PeNB collected by the traffic load information collector 122. More specifically, the division ratio determination unit 123 determines the resource division ratio such that the ratio between frequency band m of the unusable PDSCH resources and frequency band n of the usable PDSCH resources may be equal to the ratio between the number $N_{PUE}$ of radio terminals PUE and the number $N_{MUE}$ of radio terminals MUE. In other words, the division ratio determination unit 123 determines the resource division ratio such that, with the traffic load of the macro-cell base station MeNB being constant, the higher the traffic load of the pico-cell base station PeNB, the more the usable PDSCH resources and the less the unusable PDSCH resources. Desirably, the division ratio determination unit 123 updates the resource division ratio periodically.

The resource allocator 124 is configured to allocate radio resources (resource blocks) to the radio terminal MUE from the usable PDSCH resources defined according to the resource division ratio determined by the division ratio determination unit 123. For example, the resource allocator 124 allocates radio resources (resource blocks) to the radio terminal MUE from the usable PDSCH resources based on the CQIs fed back from the radio terminal MUE and by using a scheduling algorithm such as proportional fairness (PF).

(4) Configuration of the Pico-Cell Base Station

Figure 6:
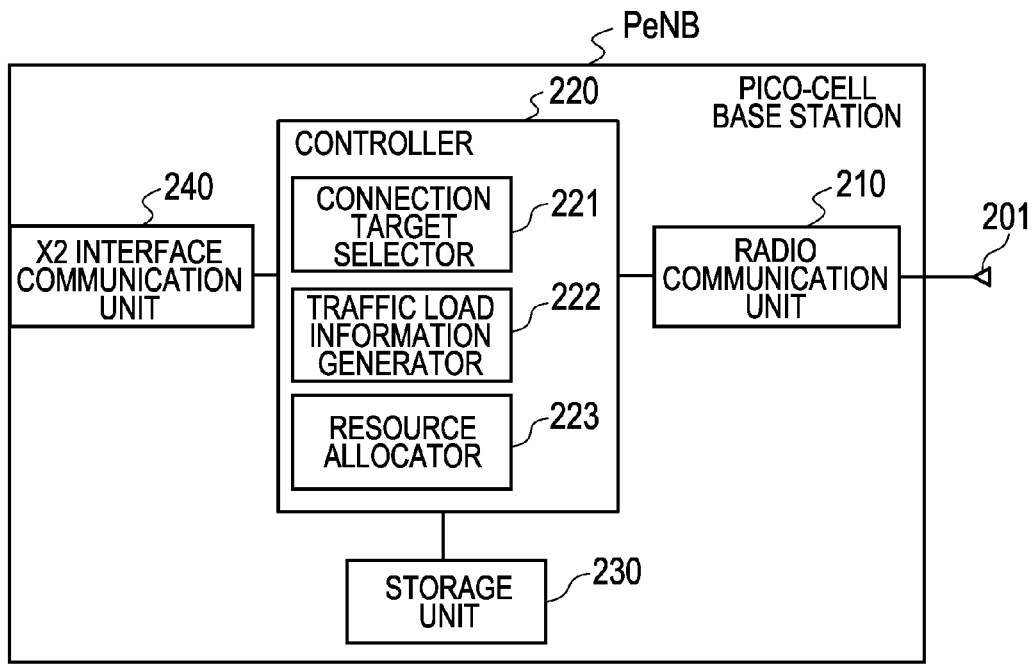
FIG. 6 is a block diagram showing the configuration of a pico-cell base station according to the first embodiment.

The configuration of the pico-cell base station PeNB is described next. FIG. 6 is a block diagram showing the configuration of the pico-cell base station PeNB according to the first embodiment.

As shown in FIG. 6, the pico-cell base station PeNB includes an antenna unit 201, a radio communication unit 210, a controller 220, a storage unit 230, and an X2 interface communication unit 240.

The radio communication unit 110 is configured with, for example, a radio frequency (RF) circuit, a base band (BB) circuit, or the like, and configured to exchange radio signals with the radio terminal PUE via the antenna unit 201. The radio communication unit 210 is also configured to modulate transmission signals and demodulate received signals.

The controller 220 is configured with a CPU for example, and is configured to control various functions of the pico-cell base station PeNB. The storage unit 230 is configured with a memory for example, and is configured to store various pieces of information used for the control of the pico-cell base station PeNB, or the like. The X2 interface communication unit 240 is configured to use the X2 interface to perform communications with other radio base stations.

The controller 220 includes a connection target selector 221, a traffic load information generator 222, and a resource allocator 223.

The connection target selector 221 is configured to select the radio base station to which the radio terminal PUE is to be connected next, based on the RSRPs informed of by the radio terminal PUE connected to the pico-cell base station PeNB. When the radio terminal PUE receives reference signals from the macro-cell base station MeNB and the pico-cell base stations PeNB, before comparing $RSRP_{MeNB}$ of the macro-cell base station MeNB and $RSRP_{PeNB}$ of each of the pico-cell base stations PeNB, the connection target selector 221 gives bias to $RSRP_{PeNB}$. When $RSRP_{PeNB}$ thus given bias is lower than $RSRP_{MeNB}$, the connection target selector 221 performs hand-over control, switching the connection target of the radio terminal PUE to the macro-cell base station MeNB.

The traffic load information collector 222 is configured to generate traffic load information indicating, as a traffic load, the number of active radio terminals PUE of all the radio terminals PUE connected to the pico-cell base station PeNB.

The resource allocator 223 is configured to allocate radio resources (resource blocks) to the radio terminal PUE. For example, the resource allocator 223 allocates radio resources (resource blocks) to the radio terminal MUE from the usable PDSCH resources, based on the CQIs fed back from the radio terminal PUE and by using a scheduling algorithm such as proportional fairness (PF).

(5) Operations of Radio Communication System

Figure 7:
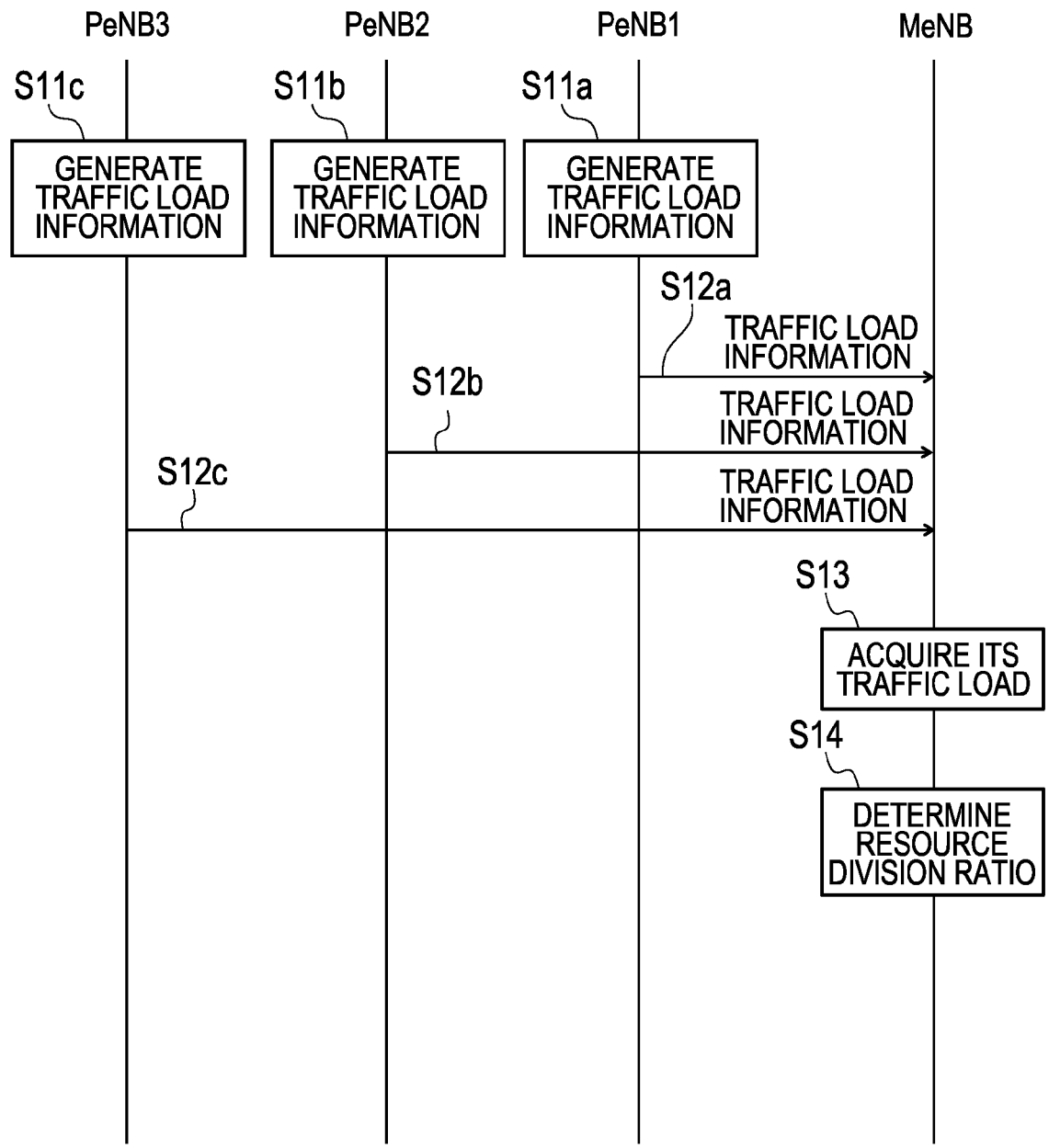
FIG. 7 is an operation sequence diagram showing the operations of the radio communication system according to the first embodiment.

FIG. 7 is an operation sequence diagram showing the operations of the radio communication system 1 according to the first embodiment.

In Step S11a, the traffic load information generator 222 of the pico-cell base station PeNB1 generates its traffic load information indicating the number of active radio terminals PUE of all the radio terminals PUE connected to the pico-cell base station PeNB1. In Step 12a, the X2 interface communication unit 240 of the pico-cell base station PeNB1 sends the traffic load information to the macro-cell base station MeNB. The X2 interface communication unit 140 of the macro-cell base station MeNB receives the traffic load information.

In Step S11b, the traffic load information generator 222 of the pico-cell base station PeNB2 generates its traffic load information indicating the number of active radio terminals PUE of all the radio terminals PUE connected to the pico-cell base station PeNB2. In Step 12b, the X2 interface communication unit 240 of the pico-cell base station PeNB2 sends the traffic load information to the macro-cell base station MeNB. The X2 interface communication unit 140 of the macro-cell base station MeNB receives the traffic load information.

In Step S11c, the traffic load information generator 222 of the pico-cell base station PeNB3 generates its traffic load information indicating the number of active radio terminals PUE of all the radio terminals PUE connected to the pico-cell base station PeNB3. In Step 12c, the X2 interface communication unit 240 of the pico-cell base station PeNB3 sends the traffic load information to the macro-cell base station MeNB. The X2 interface communication unit 140 of the macro-cell base station MeNB receives the traffic load information.

In this way, the X2 interface communication unit 140 of the macro-cell base station MeNB serves as a receiver configured to receive the traffic load information.

In Step S13, the traffic load information collector 122 of the macro-cell base station MeNB collects the traffic load information on each of the pico-cell base stations PeNB1 to PeNB3 and traffic load information on the macro-cell base station MeNB (information on the number of active radio terminals MUE of all the radio terminals MUE connected to the macro-cell base station MeNB).

In Step 14, the division ratio determination unit 123 of the macro-cell base station MeNB determines a resource division ratio based on the traffic load information on each of the pico-cell base stations PeNB1 to PeNB3 and the traffic load information on the macro-cell base station MeNB. Then, the resource allocator 124 of the macro-cell base station MeNB allocates radio resources (resource blocks) to the radio terminal MUE from the usable PDSCH resources defined according to the resource division ratio determined by the division ratio determination unit 123.

(6) Advantageous Effects of First Embodiment

As described above, in the radio communication system 1, radio resources usable as PDSCH have unusable PDSCH resources which cannot be used by the macro-cell base station MeNB. Being able to use the radio resources corresponding to the unusable PDSCH resources as their PDSCHs, the pico-cell base stations PeNB can avoid interference from the macro-cell base station MeNB, improving the throughput of the pico-cell base station PeNB.

Further, since the resource division ratio is determined based on the traffic load of each of the pico-cell base stations PeNB, the ratio between the unusable PDSCH resources and usable PDSCH resources of the macro-cell base station MeNB can be appropriately set, preventing the unusable PDSCH resources from being overmuch. Thereby, not only is the throughput of the pico-cell base station PeNB improved, but also decrease in the throughput of the macro-cell base station MeNB can be prevented, allowing an improvement in the throughput of the overall system.

In the first embodiment, the division ratio determination unit 123 determines the resource division ratio based on the mean of the traffic loads of the multiple pico-cell base stations PeNB. Accordingly, even in a case where more than one pico-cell base station PeNB is installed in the communication area of the macro-cell base station MeNB, the ratio between the unusable PDSCH resources and the usable PDSCH resources can be set appropriately.

In the first embodiment, the traffic loads of the pico-cell base stations PeNB and the traffic load of the macro-cell base station MeNB are used to determine the resource division ratio. Accordingly, the resource division ratio can be determined in consideration of not only the traffic loads of the pico-cell base stations PeNB but also the traffic load of the macro-cell base station MeNB, and therefore the resource division ratio can be set more appropriately.

Second Embodiment

In the first embodiment, the macro-cell base station MeNB determines the resource division ratio. In the second embodiment, the pico-cell base station PeNB determines the resource division ratio instead. In the following, points different from the first embodiment are described, while overlapping points are not described again.

Figure 8:
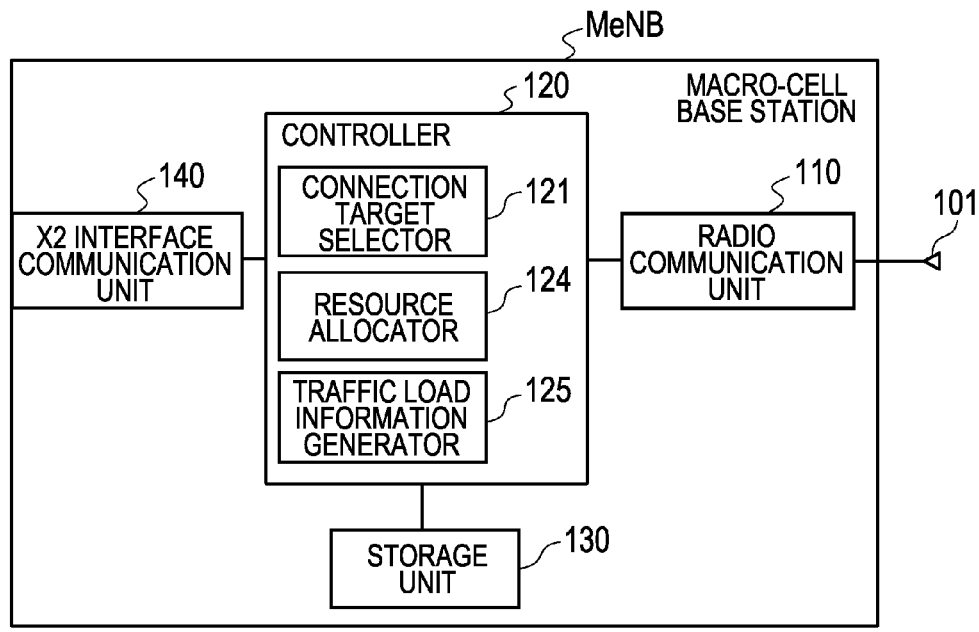
FIG. 8 is a block diagram showing the configuration of a macro-cell base station according to the second embodiment.

FIG. 8 is a block diagram showing the configuration of a macro-cell base station MeNB according to the second embodiment.

As shown in FIG. 8, the macro-cell base station MeNB according to the second embodiment has a traffic load information generator 125, and does not have the traffic load information collector 122 and the division ratio determination unit 123 described in the first embodiment. The traffic load information generator 125 is configured to generate traffic load information (information on the number of active radio terminals MUE of all the radio terminals MUE connected to the macro-cell base station MeNB).

Figure 9:
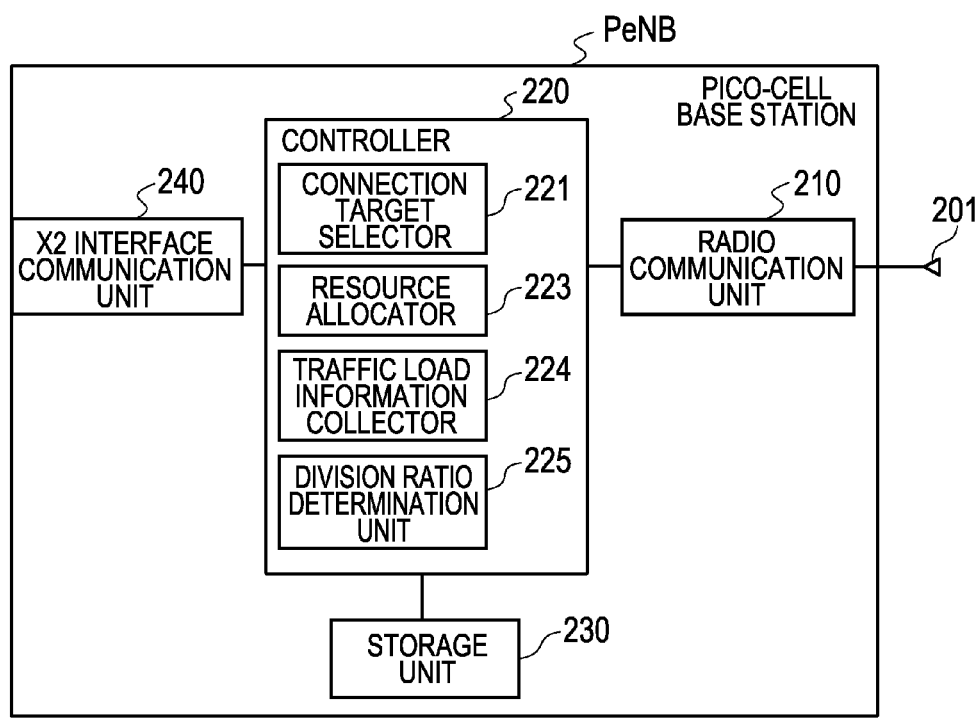
FIG. 9 is a block diagram showing the configuration of a pico-cell base station according to the second embodiment.

FIG. 9 is a block diagram showing the configuration of a pico-cell base station PeNB according to the second embodiment.

As shown in FIG. 9, the pico-cell base station PeNB according to the second embodiment has a traffic load information collector 224 and a division ratio determination unit 225. The traffic load information collector 224 is configured to periodically collect the traffic load information on each of the macro-cell base station MeNB and the pico-cell base stations PeNB. The division ratio determination unit 225 is configured to determine a resource division ratio using a method similar to that in the first embodiment, based on the traffic load information on each of the macro-cell base station MeNB and the pico-cell base stations PeNB collected by the traffic load information collector 224.

Figure 10:
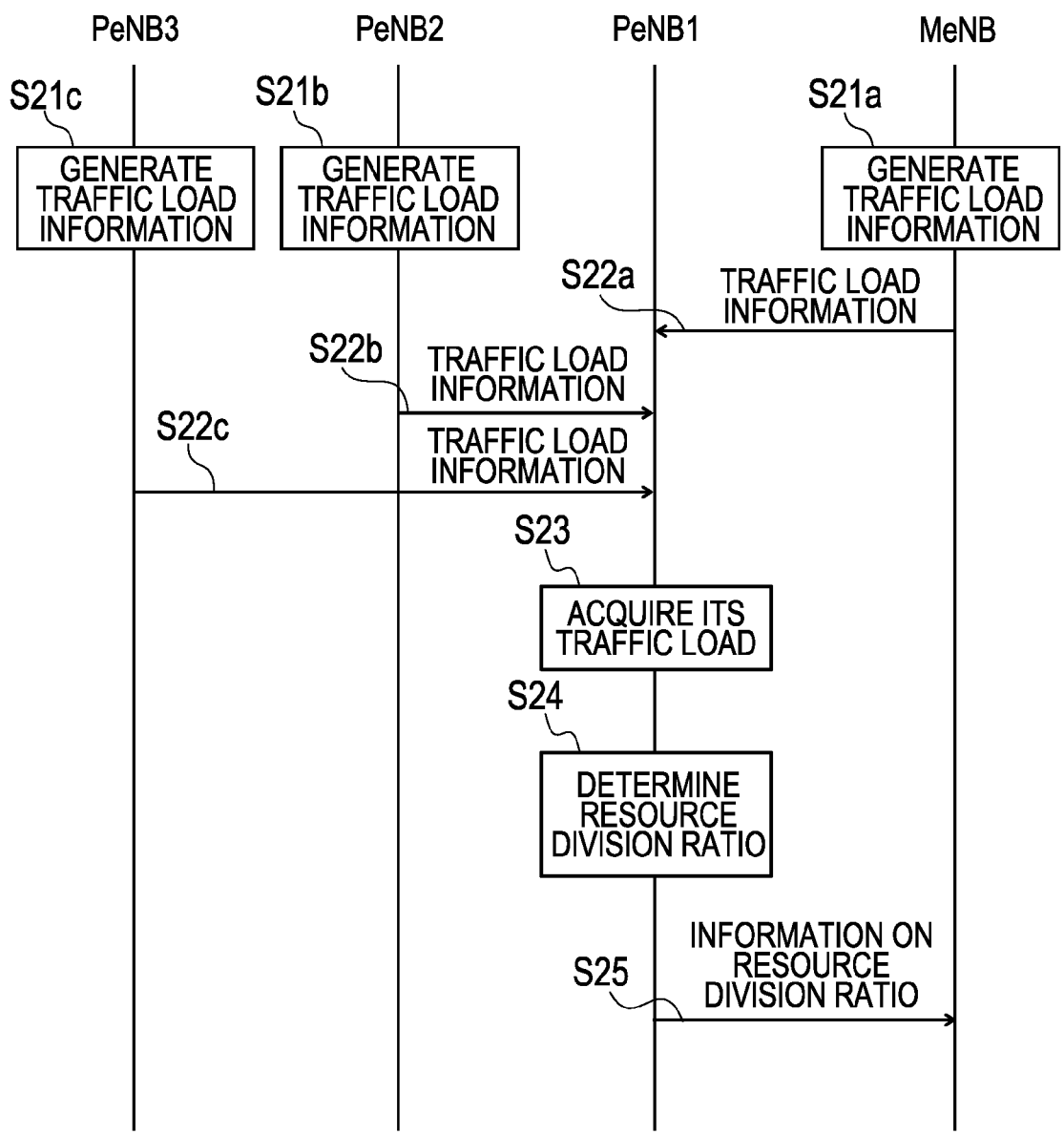
FIG. 10 is an operation sequence diagram showing the operations of a radio communication system according to the second embodiment.

FIG. 10 is an operation sequence diagram showing the operations of the radio communication system 1 according to the second embodiment. The operation sequence shown in FIG. 10 is performed periodically.

In Step S21a, the traffic load information generator 125 of the macro-cell base station MeNB generates its traffic load information indicating the number of active radio terminals MUE of all the radio terminals MUE connected to the macro-cell base station MeNB. In Step S22a, the X2 interface communication unit 140 of the macro-cell base station MeNB sends the traffic load information to the pico-cell base station PeNB1. The X2 interface communication unit 240 of the pico-cell base station PeNB1 receives the traffic load information.

In Step S21b, the traffic load information generator 222 of the pico-cell base station PeNB2 generates its traffic load information indicating the number of active radio terminals PUE of all the radio terminals PUE connected to the pico-cell base station PeNB2. In Step S22b, the X2 interface communication unit 240 of the pico-cell base station PeNB2 sends the traffic load information to the pico-cell base station PeNB1. The X2 interface communication unit 240 of the pico-cell base station PeNB1 receives the traffic load information.

In Step S21c, the traffic load information generator 222 of the pico-cell base station PeNB3 generates its traffic load information indicating the number of active radio terminals PUE of all the radio terminals PUE connected to the pico-cell base station PeNB3. In Step S22c, the X2 interface communication unit 240 of the pico-cell base station PeNB3 sends the traffic load information to the pico-cell base station PeNB1. The X2 interface communication unit 240 of the pico-cell base station PeNB1 receives the traffic load information.

In Step S23, the traffic load information collector 224 of the pico-cell base station PeNB1 collects the traffic load information on the macro-cell base station MeNB and the traffic load information on each of the pico-cell base stations PeNB1 to PeNB3.

In Step S24, the division ratio determination unit 225 of the pico-cell base station PeNB1 determines a resource division ratio based on the traffic load information on the macro-cell base station MeNB and the traffic load information on each of the pico-cell base stations PeNB1 to PeNB3.

In Step S25, the X2 interface communication unit 240 of the pico-cell base station PeNB1 sends the macro-cell base station MeNB information indicating the resource division ratio determined by the division ratio determination unit 225. The X2 interface communication unit 140 of the macro-cell base station MeNB receives the information indicating the resource division ratio. In this way, in the second embodiment, the X2 interface communication unit 240 serves as a transmitter configured to transmit the resource division ratio.

Thereafter, the resource allocator 124 of the macro-cell base station MeNB allocates radio resources (resource blocks) to the radio terminal MUE from the usable PDSCH resources defined according to the information indicating the resource division ratio received by the X2 interface communication unit 140.

As above, the second embodiment can offer effects similar to those of the first embodiment.

Third Embodiment

In the first and second embodiments, the PDSCH resources of the macro-cell base station MeNB are divided by frequency into the unusable PDSCH resources which cannot be used by the macro-cell base station MeNB and the usable PDSCH resources which can be used by the macro-cell base station MeNB.

In the third embodiment, the PDSCH resources of the macro-cell base station MeNB are divided by frequency into low-power PDSCH resources and ordinary-power PDSCH resources. The low-power PDSCH resources can be used by the macro-cell base station MeNB, but are controlled to be lower in transmission power than the ordinary-power PDSCH resources. In the third embodiment, the ordinary-power PDSCH resources correspond to the first radio resources, whereas the low-power PDSCH resources correspond to the second radio resources.

Figure 11:
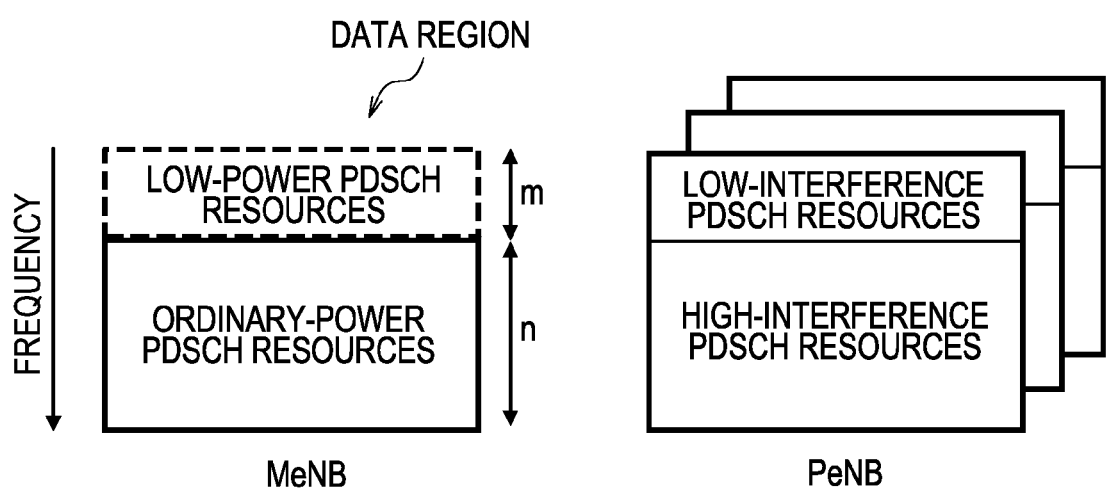
FIG. 11 is a diagram illustrating ICIC according to the third embodiment.

FIG. 11 is a diagram illustrating ICIC according to the third embodiment. Here, points different from the first embodiment are mainly described.

As shown in FIG. 11, in the third embodiment, the low-power PDSCH resources are at least part of the total downlink resource blocks, and the ordinary-power PDSCH resources are the rest of the downlink total resource block, i.e., resource blocks other than the part described above.

The radio resources of the pico-cell base station PeNB which correspond to the low-power PDSCH resources of the macro-cell base station MeNB suffer low interference from the macro-cell base station MeNB. Accordingly, the pico-cell base station PeNB allocates such PDSCH resources of low interference to the radio terminal PUE of a low SINR. The radio terminal PUE periodically feeds back a measurement result of reception quality to the pico-cell base station PeNB as a channel quality indicator (CQI), and the pico-cell base station PeNB can allocate the low-interference PDSCH resources preferentially to the radio terminal PUE in response to feedback of a favorable CQI for the low-interference PDSCH resources.

Preferably, the macro-cell base station MeNB allocates the low-power PDSCH resources to the radio terminal MUE close to the macro-cell base station MeNB. To be more specific, the resource allocator 124 of the macro-cell base station MeNB allocates resources (RBs) from the low-power PDSCH resources to the radio terminal MUE having a favorable CQI for the low-power PDSCH resources or to the radio terminal MUE having small path loss with the macro-cell base station MeNB. The resource allocator 124 of the macro-cell base station MeNB allocates resources (RBs) from the ordinary-power PDSCH resources to the radio terminal MUE having an unfavorable CQI for the low-power PDSCH resources or to the radio terminal MUE having large path loss with the macro-cell base station MeNB.

In the third embodiment, as in the first embodiment, a resource division ratio, which is the ratio between the low-power PDSCH resources and the ordinary-power PDSCH resources, is determined based on the traffic loads of the pico-cell base stations PeNB and the traffic load of the macro-cell base station MeNB. Also in the third embodiment, the number of active radio terminals is used as the traffic load. Further, as in the first embodiment, the resource division ratio is in accordance with the resolution of a fed-back CQI.

The ratio (m:n) between frequency band m of the low-power PDSCH resources and frequency band n of the ordinary-power PDSCH resources is equal to the ratio ($N_{PUE}$:$N_{MUE}$) between the number $N_{PUE}$ of radio terminals PUE and the number $N_{MUE}$ of radio terminals MUE. The number $N_{MUE}$ of radio terminals PUE is the mean of the numbers of radio terminals PUE of the respective pico-cell base stations PeNB1 to PeNB3. As in the first embodiment, the number of resource blocks RB of the low-power PDSCH resources is obtained from the ratio between frequency band m of the low-power PDSCH resources and frequency band n of the ordinary-power PDSCH resources, as shown in Formula (1).

As described above, the third embodiment offers lower effect of reducing interference against the pico-cell base station PeNB than the first embodiment, but provides more usable PDSCH resources to the macro-cell base station MeNB than the first embodiment. Accordingly, the throughput of the macro-cell base station MeNB can be improved.

Other Embodiments

As described above, the present invention has been disclosed by using the embodiments. However, it should not be understood that the description and drawings which constitute part of this disclosure limit the present invention. From this disclosure, various alternative embodiments, examples, and operation techniques will be easily found by those skilled in the art.

Figure 12:
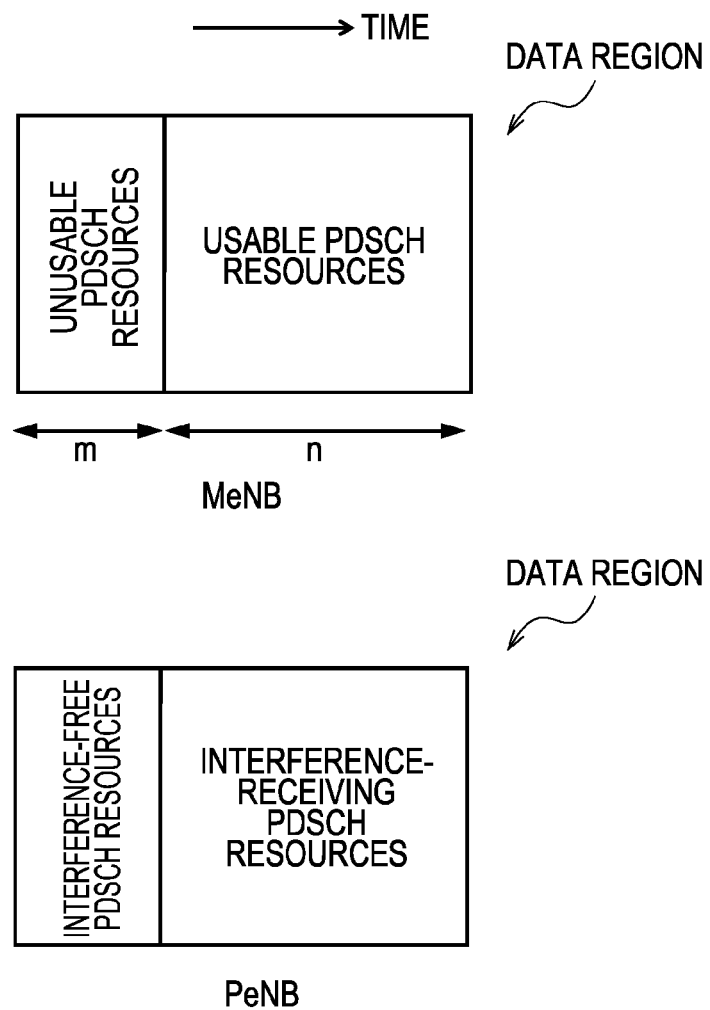
FIG. 12 is a diagram illustrating a case of dividing PDSCH resources by time.

In the embodiments described above, the PDSCH resources are divided by frequency, but the PDSCH resources may be divided by time. FIG. 12 is a diagram showing a case of dividing the PDSCH resources by time. As shown in FIG. 12, the data region of a downlink subframe is divided by time. The ratio between time range m of the unusable PDSCH resources (or the low-power PDSCH resources) and time range n of the usable PDSCH resources (or the ordinary-power PDSCH resources) is equal to the ratio between the number $N_{PUE}$ of radio terminals MUE and the number $N_{MUE}$ of radio terminals PUE. The number $N_{MUE}$ of radio terminals PUE is the mean of the numbers of radio terminals PUE of the respective pico-cell base stations PeNB1 to PeNB3 in the same macro cell. Any unit can be set for the time division, but due to the LTE specifications, the resources are divided in a unit of OFDM symbol.

Figure 2:
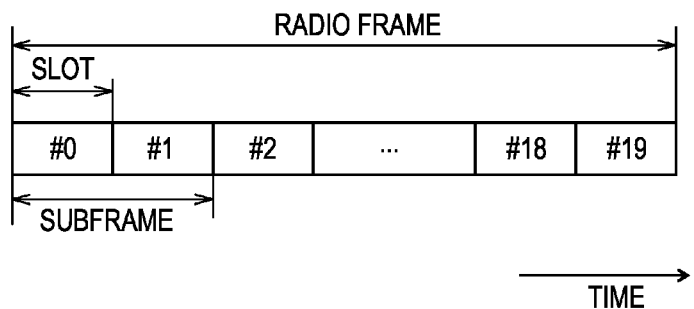
FIG. 2 is a diagram illustrating a communication frame configuration of the LTE system.
Figure 2:
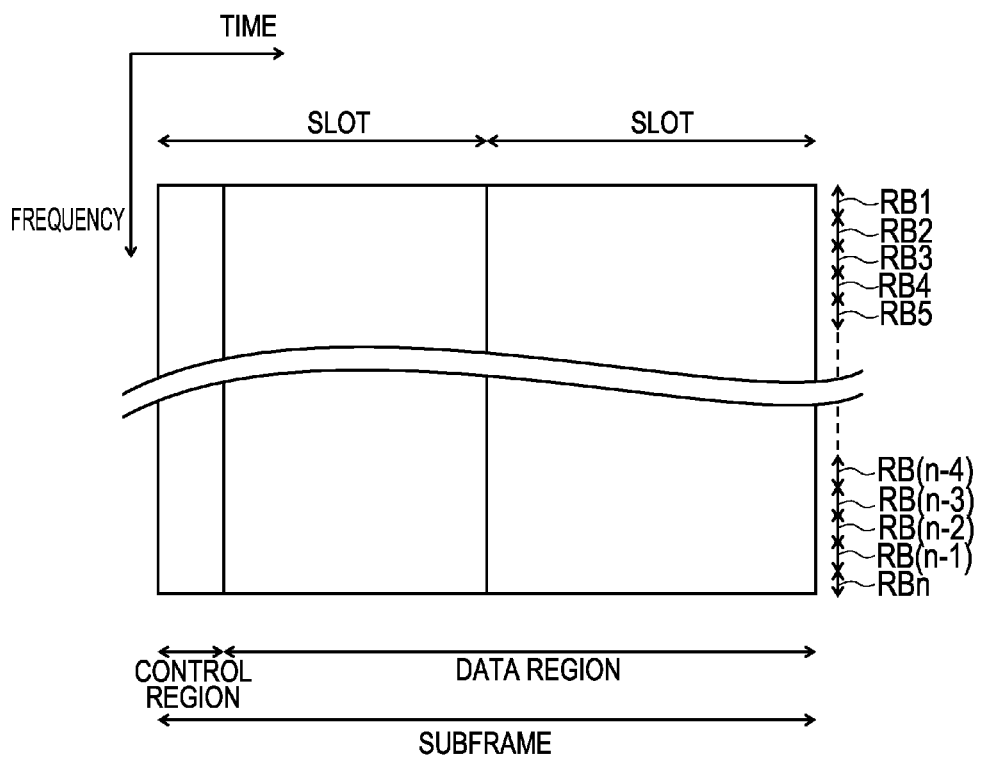
Figure 13:
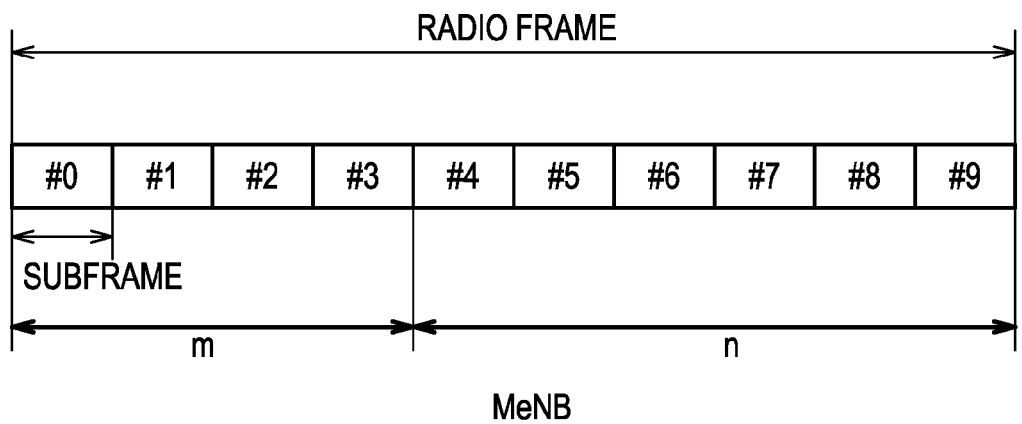
FIG. 13 is a diagram illustrating another case of dividing PDSCH resources by time.

Instead of dividing a subframe by time in a unit of OFDM symbol, a radio frame shown in FIG. 2 may be divided by time in a unit of subframe. FIG. 13 is a diagram illustrating a case of dividing a radio frame by time in a unit of subframe. As shown in FIG. 13, in a single radio frame, the ratio between time range m of the unusable PDSCH resources (or the low-power PDSCH resources) and time range n of the usable PDSCH resources (or the ordinary-power PDSCH resources) is equal to the ratio between the number $N_{PUE}$ of radio terminals MUE and the number $N_{MUE}$ of radio terminals PUE. The number $N_{MUE}$ of radio terminals PUE is the mean of the numbers of radio terminals PUE of the respective pico-cell base stations PeNB1 to PeNB3 in the same macro cell.

In the embodiments described above, the resource division involves division of PDSCH resources (i.e., division of a data region). However, the present invention is not limited to PDSCH, and is also applicable to division of PDCCH resources (i.e., division of a control region). Either of the frequency division or the time division may be used for the division of PDCCH resources.

Although the coverage of the pico-cell base station PeNB is expanded in the embodiments described above, the present invention is not limited to such a case. Even in a case where the coverage of the pico-cell base station PeNB is not expanded, the present invention is still effective in reducing interference between the base stations in a heterogeneous network.

Although the traffic load is the number of active radio terminals in the embodiments described above, the present invention is not limited to such a traffic load index. For example, the traffic load may be a radio-resource use rate or the amount of packets exchanged.

In LTE Advanced, a relay node which is a radio base station configuring a wireless backhaul is expected to be employed, and the X2 interface is to be employed for the relay node as well. Accordingly, the relay node can be the low-power base station according to the present invention.

Further, the present invention is applied to the LTE system in the embodiments described above, but may be applied to other radio communication systems such as a radio communication system based on WiMAX (IEEE 802.16).

[Simulation Results]

Finally, effects obtained by the above embodiments are described using simulation results.

In a scenario assumed in this simulation, multiple pico-cell base stations PeNB each of a 40-m radius are in a cell formed by a macro-cell base station MeNB. Multiple radio terminals UE are present in each pico-cell base station PeNB in a concentrated manner. Evaluations are made on two scenarios to validate how the coverage expansion is influenced by different traffic levels. In either of the scenarios, an average of 30 radio terminals UE exist per macro cell. In one of the scenarios, the pico-cell base stations PeNB have low traffic. Specifically, the macro cell has two hot zones, and at least two radio terminals UE are distributed in each pico-cell base station PeNB. The rest of the radio terminals, i.e., 26 radio terminals UE, are distributed in the macro-cell area including the pico-cell base stations PeNB. In the other scenario, the pico-cell base stations PeNB have relatively high traffic, each having a concentration of radio terminals UE. Specifically, the macro cell has two hot zones, and at least ten radio terminals UE are evenly distributed in each pico-cell base station PeNB. The rest of the radio terminals, i.e., 10 radio terminals UE, are evenly distributed in the macro-cell area including the pico-cell base stations PeNB. It is assumed that, ideally, PDCCH and other control signals are acquirable.

(1) Low Traffic

Figure 14:
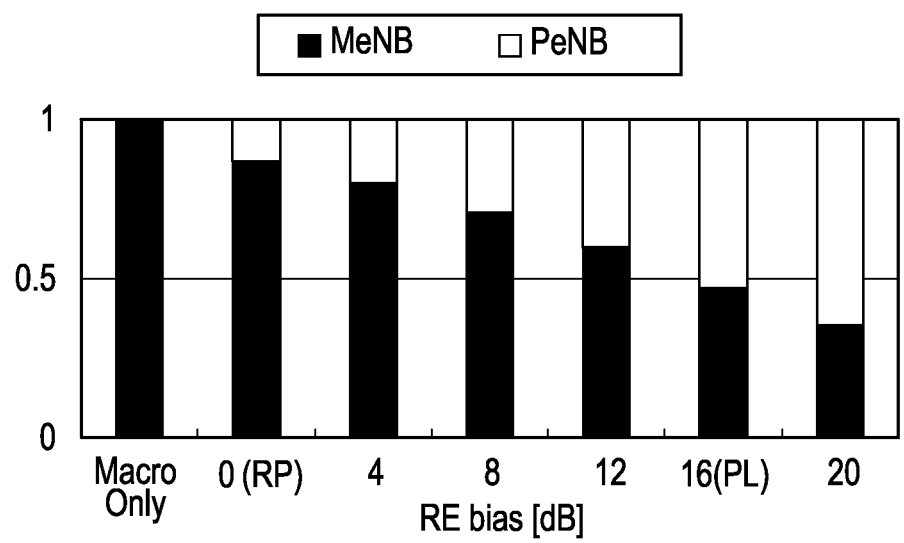
FIG. 14 is a diagram showing ratios of terminals connected to the base stations, with bias values.
Figure 14:
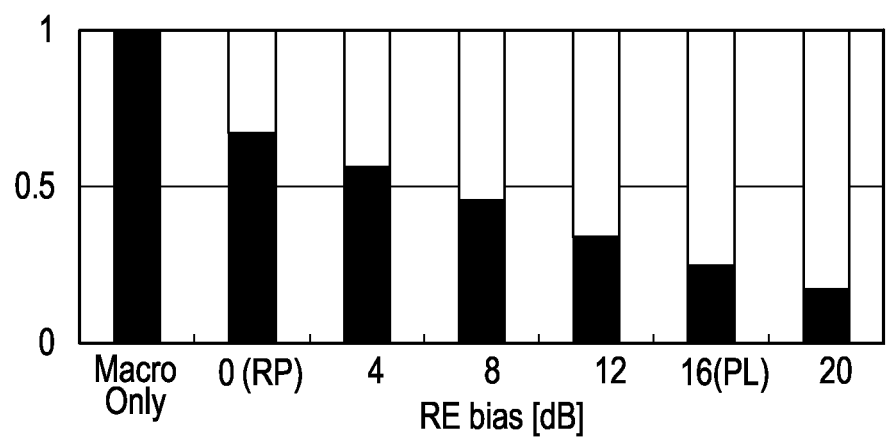
Figure 15:
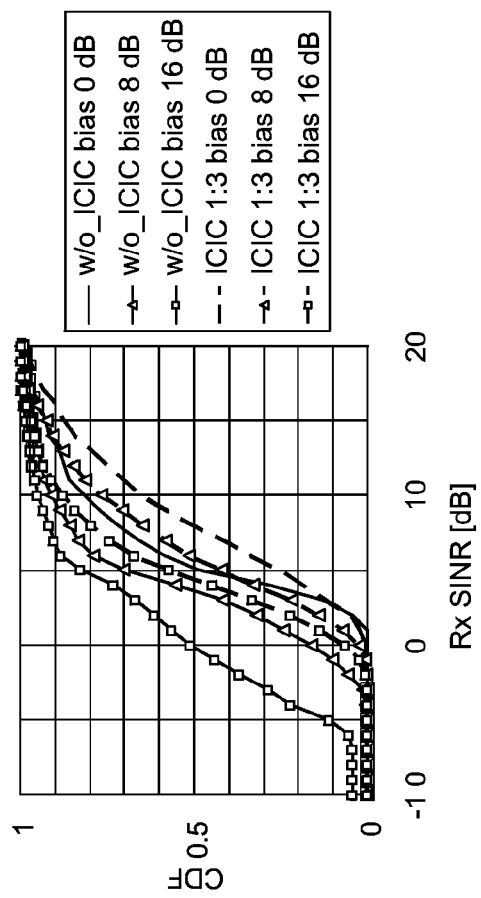
FIG. 15 is a diagram showing simulation results of when the pico-cell base station has low traffic.
Figure 15:
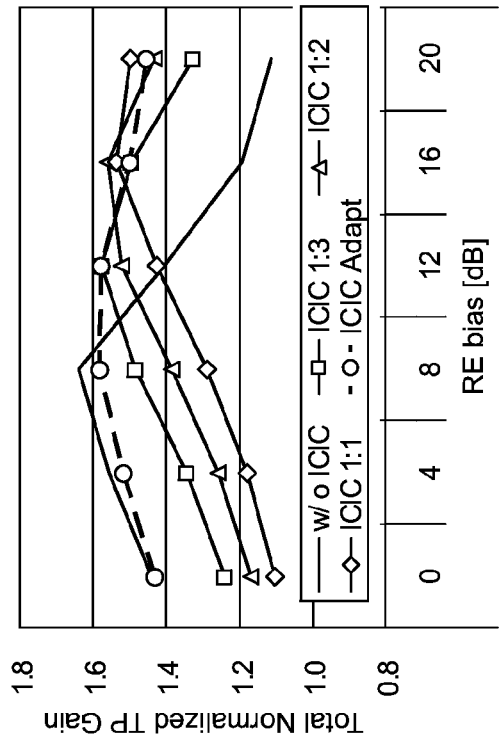

A description is given of simulation results for the low traffic scenario. FIG. 14(a) shows ratios of terminals connected to the base stations using RE bias values. Table 1 shows throughputs (5% worst/Median/Average) normalized to the value of a case "macro-cell only," and FIG. 15(a) shows their averages plotted as a graph. FIG. 15(b) shows CDF5 (cumulative density functions) of SINR5 received in the hot zones without ICIC and with ICIC (1:3).

combined, at zero bias value of the RE standard, i.e., with the RP standard, the performance is lower than that without ICIC, and is even lower than that of the case "macro-cell only" for 5% worst and Median TP. The reason for this is that the resources of the macro-cell base station MeNB are reduced by the frequency division in a situation where the coverage expansion of the hot zones is not sufficient to distribute the load and therefore high throughput of the radio terminals MUE is not expectable. By increasing the RE bias value, the performance starts to improve because the load of the macro-cell base station MeNB is distributed to the hot zones. Here, it can be seen in FIG. 15(b) that by the effects of ICIC, RE coverage expansion is made possible while SINR deterioration is suppressed more than that without ICIC. The relation between the load distribution by RE and ICIC by the frequency division is examined here. A correlation is found between the ratio of the number of radio terminals MUE to the number of radio terminals UE per hot zone and the ratio of frequency division. That is, the peak appears when these ratios are close to each other. By employing ICIC which adaptively changes the frequency division ratio, many bias values show performance which is best at the time, close to static ICIC.

TABLE 1

Normalized Throughput

| | RE bias [dB] | | | | | | | | | | | | | | | | | |
|---|---|---|---|---|---|---|---|---|---|---|---|---|---|---|---|---|---|---|
| | 0 (RP) | | | 4 | | | 8 | | | 12 | | | 16(PL) | | | 20 | | |
| ICIC | Ave | 5% | Med | Ave | 5% | Med | Ave | 5% | Med | Ave | 5% | Med | Ave | 5% | Med | Ave | 5% | Med |
| wo | 2.0 | 1.1 | 1.2 | 2.0 | 1.2 | 1.5 | 1.9 | 1.4 | 1.7 | 1.8 | 0.7 | 1.7 | 1.9 | 0.0 | 1.7 | 1.9 | 0.0 | 1.4 |
| 1:3 | 2.1 | 0.7 | 0.9 | 2.1 | 0.8 | 1.1 | 2.0 | 1.0 | 1.5 | 1.9 | 1.2 | 1.6 | 1.9 | 0.9 | 1.7 | 1.9 | 0.6 | 1.5 |
| 1:2 | 2.2 | 0.6 | 0.8 | 2.2 | 0.7 | 1.0 | 2.1 | 0.8 | 1.3 | 2.0 | 1.0 | 1.5 | 1.9 | 1.1 | 1.7 | 1.9 | 0.8 | 1.6 |
| 1:1 | 2.2 | 0.4 | 0.6 | 2.2 | 0.5 | 0.8 | 2.2 | 0.6 | 1.1 | 2.0 | 0.8 | 1.4 | 1.9 | 1.1 | 1.6 | 1.9 | 1.0 | 1.6 |
| Adapt | 2.0 | 1.0 | 1.2 | 2.0 | 1.2 | 1.4 | 1.9 | 1.2 | 1.6 | 1.9 | 1.2 | 1.7 | 1.9 | 0.9 | 1.7 | 1.9 | 0.8 | 1.7 |

Figure 16:
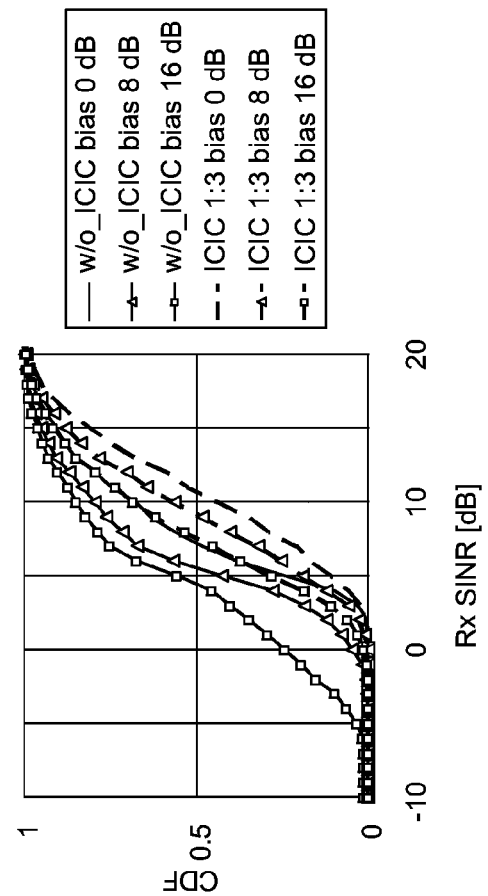
FIG. 16 is a diagram showing simulation results of when the pico-cell base station has high traffic.
Figure 16:
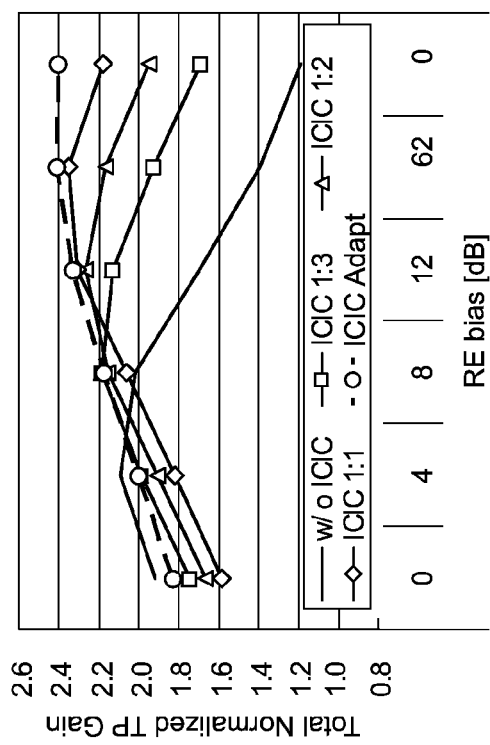

As can be seen in FIG. 14(a), by increasing bias of the RE standard, the coverage of the pico-cell base station PeNB is expanded, increasing the rate of the radio terminals UE connected to the pico-cell base stations PeNB. This indicates that the load is distributed. However, as can be seen in 13(a), without ICIC, the downlink user throughput is at its maximum when the RE bias value is 8 dB, and the throughput decreases as the bias values exceeds 8 dB. From FIG. 15(b), the reason for this in this scenario is thought to be due to an increase of the radio terminals UE with a low SINR in the hot zones. On the other hand, when ICIC by frequency division is (2) High Traffic A description is given of simulation results for the high traffic scenario. FIG. 14(b) shows ratios of terminals connected the base stations using RE bias values. Table 2 shows throughputs (5% worst/Median/Average) normalized to the value of a case "macro-cell only," and FIG. 16(a) shows their averages plotted as a graph. FIG. 16(b) shows CDFs (cumulative density functions) of SINR5 received in the hot zones without ICIC and with ICIC (1:3).

TABLE 2

Normalized Throughput

| | RE bias [dB] | | | | | | | | | | | | | | | | | |
|---|---|---|---|---|---|---|---|---|---|---|---|---|---|---|---|---|---|---|
| | 0 (RP) | | | 4 | | | 8 | | | 12 | | | 16(PL) | | | 20 | | |
| ICIC | Ave | 5% | Med | Ave | 5% | Med | Ave | 5% | Med | Ave | 5% | Med | Ave | 5% | Med | Ave | 5% | Med |
| wo | 2.5 | 1.5 | 1.8 | 2.4 | 1.8 | 2.1 | 2.3 | 1.6 | 2.2 | 2.3 | 0.8 | 2.0 | 2.3 | 0.3 | 1.6 | 2.3 | 0.0 | 1.3 |
| 1:3 | 2.8 | 1.0 | 1.4 | 2.7 | 1.3 | 2.0 | 2.6 | 1.7 | 2.3 | 2.5 | 1.5 | 2.4 | 2.5 | 1.1 | 2.2 | 2.4 | 0.8 | 1.8 |
| 1:2 | 2.9 | 0.8 | 1.2 | 2.8 | 1.1 | 1.8 | 2.7 | 1.5 | 2.2 | 2.6 | 1.7 | 2.5 | 2.6 | 1.5 | 2.5 | 2.5 | 1.1 | 2.2 |
| 1:1 | 3.1 | 0.6 | 1.0 | 3.0 | 0.9 | 1.6 | 2.9 | 1.2 | 2.1 | 2.8 | 1.7 | 2.5 | 2.7 | 1.7 | 2.6 | 2.6 | 1.4 | 2.5 |
| Adapt | 2.6 | 1.2 | 1.7 | 2.6 | 1.4 | 2.0 | 2.6 | 1.7 | 2.2 | 2.7 | 1.8 | 2.5 | 2.7 | 1.8 | 2.7 | 2.7 | 1.7 | 2.8 |

Overall, compared to the low traffic scenario, gain by the heterogeneous network is largely apparent. Further, as can be seen in FIG. 16(a), the performance peak appears at a bias value which is lower than that in the low traffic scenario. These characteristics are deemed to be due to the tendency that, because the radio terminals UE exist around the hot zones with high density, even a low bias value increases the ratio of terminals UE connected to the pico-cell base stations PeNB, as shown in FIG. 14(b). In other words, the effects of the load distribution can be sufficiently obtained by covering the 40-m radius hot zones which are high-load regions. This indicates that the performance of the heterogeneous network can be improved relatively easily by arranging the hot zones in high traffic areas at the time of designing base station establishment. By employing ICIC which adaptively changes the frequency division ratio, many bias values show performance which is best at the time, equivalent to or better than static ICIC.

This application claims the benefit of priority from Japanese Patent Application Nos. 2010-95548 (filed on Apr. 16, 2010) and 2010-253279 (filed on Nov. 11, 2010), the entire contents of which are incorporated herein by reference.

INDUSTRIAL APPLICABILITY

As described, the radio communication system, the high-power base station, the low-power base station, and the communication control method according to the present invention can reduce interference between the base stations in the heterogeneous network to improve throughput of the overall system, and therefore are useful in radio communication such as mobile communication.

The invention claimed is:

1. A radio communication system comprising:
a high-power base station; and
a low-power base station installed in a communication area of the high-power base station and having lower transmission power than the high-power base station, wherein the radio communication system further comprising a division ratio determination unit configured to determine a resource division ratio of radio resources to be used as a particular downlink channel by the high-power base station, the resource division ratio being a ratio between first radio resources and second radio resources for which transmission power is limited to lower than that of the first radio resources, wherein
the division radio determination unit determines the resource division ratio based on a traffic load of the low-power base station and a traffic load of the high-power base station such that: (1) the ratio between the second radio resources and the first radio resources is equal to a ratio between the traffic load of the low-power base station and the traffic load of the high-power base station; (2) with the traffic load of the high-power base station being constant, the higher the traffic load of the low-power base station, the more the second radio resources and the less the first radio resources; or (3) with the traffic load of the low-power base station being constant, the higher the traffic load of the high-power base station, the less the second resources and the more the first resources.

2. The radio communication system according to claim 1, further comprising
a resource allocator configured to allocate radio resources to a radio terminal connected to the high-power base station, wherein
the first radio resources are radio resources usable by the high-power base station,
the second radio resources are radio resources unusable by the high-power base station, and
the resource allocator allocates radio resources to the radio terminal connected to the high-power base station from the first radio resources defined according to the resource division ratio determined by the division ratio determination unit.

3. The radio communication system according to claim 1, further comprising
a resource allocator configured to allocate radio resources to a radio terminal connected to the high-power base station, wherein
the first radio resources are radio resources for which transmission power of the high-power base station is not limited,
the second radio resources are radio resources for which transmission power of the high-power base station is limited, and
the resource allocator allocates radio resources to the radio terminal connected to the high-power base station from the first radio resources and the second radio resources defined according to the resource division ratio determined by the division ratio determination unit.

4. The radio communication system according to claim 1, wherein
when a plurality of the low-power base stations are installed in the communication area of the high-power base station, the division ratio determination unit determines the resource division ratio based on a mean of traffic loads of the respective low-power base stations.

5. The radio communication system according to claim 1, wherein
the division ratio determination unit determines the resource division ratio based on the traffic load of the low-power base station and a traffic load of the high-power base station.

6. The radio communication system according to claim 5, wherein
the division ratio determination unit determines the resource division ratio such that the ratio between the second radio resources and the first radio resources is equal to a ratio between the traffic load of the low-power base station and the traffic load of the high-power base station.

7. The radio communication system according to claim 5, wherein
the division ratio determination unit determines the resource division ratio such that, with the traffic load of the high-power base station being constant, the higher the traffic load of the low-power base station, the more the second radio resources and the less the first radio resources.

8. The radio communication system according to claim 5, wherein
the division ratio determination unit determines the resource division ratio such that, with the traffic load of the low-power base station being constant, the higher the traffic load of the high-power base station, the less the second resources and the more the first resources.

9. The radio communication system according to claim 1, wherein
the particular downlink channel is a data transmission channel for transmitting user data to a radio terminal.

10. The radio communication system according to claim 1, wherein
the second radio resources are at least part of a total downlink frequency band, and
the first radio resources are the rest of the total downlink frequency band, excluding the part of the frequency band.

11. The radio communication system according to claim 10, wherein
the part and the rest of the frequency band are each an integral multiple of a frequency unit by which a radio terminal measures reception quality.

12. The radio communication system according to claim 1, wherein
the second radio resources are at least part of a time range of a data region for transmitting user data to a radio terminal in a downlink communication time frame, and
the first radio resources are the rest of the time range of the data region, excluding the part of the time range.

13. The radio communication system according to claim 1, wherein
the traffic load is the number of radio terminals in communication.

14. A high-power base station comprising:
a receiver configured to receive information indicating a traffic load of a low-power base station installed in a communication area of the high-power base station and having lower transmission power than the high-power base station; and
a division ratio determination unit configured to use the information indicating the traffic load received by the receiver to determine a resource division ratio of radio resources to be used as a particular downlink channel by the high-power base station, the resource division ratio being a ratio between first radio resources and second radio resources for which transmission power is limited to lower than that of the first radio resources; wherein
the division radio determination unit determines the resource division ratio based on a traffic load of the high-power base station such that: (1) the ratio between the second radio resources and the first radio resources is equal to a ratio between the traffic load of the low-power base station and the traffic load of the high-power base station; (2) with the traffic load of the high-power base station being constant, the higher the traffic load of the low-power base station, the more the second radio resources and the less the first radio resources; or (3) with the traffic load of the low-power base station being constant, the higher the traffic load of the high-power base station, the less the second resources and the more the first resources.

15. A low-power base station installed in a communication area of a high-power base station and having lower transmission power than the high-power base station, comprising:
a division ratio determination unit configured to use a traffic load of the low-power base station to determine a resource division ratio of radio resources to be used as a particular downlink channel by the high-power base station, the resource division ratio being a ratio between first radio resources and second radio resources for which transmission power is limited to lower than the first radio resources; wherein
the division radio determination unit also determines the resource division ratio based on a traffic load of the high-power base station such that: (1) the ratio between the second radio resources and the first radio resources is equal to a ratio between the traffic load of the low-power base station and the traffic load of the high-power base station; (2) with the traffic load of the high-power base station being constant, the higher the traffic load of the low-power base station, the more the second radio resources and the less the first radio resources; or (3) with the traffic load of the low-power base station being constant, the higher the traffic load of the high-power base station, the less the second resources and the more the first resources; and
a transmitter configured to transmit, to the high-power base station, information indicating the resource division ratio determined by the division ratio determination unit.

16. The low-power base station according to claim 15, further comprising
a receiver configured to receive information indicating a traffic load of the high-power base station, wherein
the division ratio determination unit determines the resource division ratio based on the traffic load of the low-power base station and the traffic load of the high-power base station received by the receiver.

17. A communication control method comprising:
using a traffic load of a low-power base station installed in a communication area of a high-power base station to determine a resource division ratio of radio resources to be used as a particular downlink channel by the high-power base station, the resource division ratio being a ratio between first radio resources and second radio resources for which transmission power is limited to lower than the first radio resources; and
further using a traffic load of the high-power base station to determine the resource division ratio such that: (1) the ratio between the second radio resources and the first radio resources is equal to a ratio between the traffic load of the low-power base station and the traffic load of the high-power base station; (2) with the traffic load of the high-power base station being constant, the higher the traffic load of the low-power base station, the more the second radio resources and the less the first radio resources; or (3) with the traffic load of the low-power base station being constant, the higher the traffic load of the high-power base station, the less the second resources and the more the first resources.

* * * * *